United States Patent [19]
Toye

[11] Patent Number: 5,857,554
[45] Date of Patent: Jan. 12, 1999

[54] CONVEYORS

[75] Inventor: Edward William Toye, Near Kidderminster, United Kingdom

[73] Assignee: Conveyor Units Limited, United Kingdom

[21] Appl. No.: 735,907

[22] Filed: Oct. 25, 1996

[51] Int. Cl.$^6$ .................................................. B65G 13/00
[52] U.S. Cl. ......................................... 193/35 R; 193/37
[58] Field of Search ................................... 193/35 R, 37; 384/296, 439; 198/842

[56] References Cited

U.S. PATENT DOCUMENTS

| | | | |
|---|---|---|---|
| 3,915,275 | 10/1975 | Specht | 193/35 R |
| 3,931,878 | 1/1976 | Payne | 193/37 |
| 4,059,180 | 11/1977 | Krivec | 193/37 |
| 5,048,661 | 9/1991 | Toye | 193/35 R |

FOREIGN PATENT DOCUMENTS

| | | | |
|---|---|---|---|
| 0 621 219A1 | 4/1994 | European Pat. Off. | |
| 2 119 521 | 9/1972 | France | |
| 404185909A | 7/1992 | Japan | F16C 13/04 |
| 1025391 | 4/1966 | United Kingdom | |
| 2 038 450 | 7/1980 | United Kingdom | |
| 1 578 349 | 11/1980 | United Kingdom | |
| 2 101 061 | 1/1983 | United Kingdom | |
| 2 231 017 | 7/1990 | United Kingdom | |

*Primary Examiner*—William E. Terrell
*Assistant Examiner*—K. W. Bower
*Attorney, Agent, or Firm*—Skjerven Morrill MacPherson Franklin & Friel LLP; Thomas S. MacDonald

[57] ABSTRACT

A conveyor, comprising a conveyor frame having a pair of spaced side members each having a plurality of mounting means to mount a plurality of rollers in spaced relation between the side members, each roller being provided with a bearing means having a socket, the rollers being mounted in spaced relation between said pair of side members on stub spindles, each stub spindle having a support portion which inter-engages with a mounting means non-rotatably to mount the stub spindles on the side members, there being a pair of opposed stub spindles for each roller and each stub spindle having an end portion which is received in a socket provided at each end of the roller to permit each roller to rotate about a roller axis and wherein at least at one end of each roller the support portion and the mounting means are configured for inter-engagement by relative movement therebetween transverse to said roller axis characterised in that each stub spindle is provided with retaining means to retain the end portion of the stub spindle in the socket in which it is received.

22 Claims, 2 Drawing Sheets

CONVEYORS

BACKGROUND OF THE INVENTION

This invention relates to a conveyor, hereinafter referred to as being of the kind specified, comprising a conveyor frame having a pair of spaced side members each having a plurality of mounting means to mount a plurality of rollers in spaced relation between the side members, each roller being provided with a bearing means having a socket, the rollers being mounted in spaced relation between said pair of side members on stub spindles, each stub spindle having a support portion which inter-engages with a mounting means non-rotatably to mount the stub spindles on the side members, there being a pair of opposed stub spindles for each roller and each stub spindle having an end portion which is received in a socket provided at each end of the roller to permit each roller to rotate about a roller axis and wherein at least at one end of each roller the support portion and the mounting means are configured for inter-engagement by relative movement therebetween transverse to said roller axis.

Such a conveyor is disclosed in EP-A-0621219 but requires, on site, stub spindles to be engaged in the sockets at opposite ends of each conveyor roller and the resultant combination of roller and two stub spindles be held together manually and then the stub spindles manipulated into the side members. This results in time, expense and inconvenience in assembly.

In a conveyor of the type specified, the rollers may be free running or driven. Articles may be placed directly on the conveyor rollers or on an endless conveyor belt which extends around the rollers to provide a greater support area for articles in a known manner. Such conveyors may extend horizontally or may be inclined.

SUMMARY OF THE INVENTION

An object of the invention is to provide a new and improved conveyor of the kind specified.

According to one aspect of the present invention a conveyor of the kind specified we provided wherein each stub spindle is provided with retaining means to retain the end portion of the stub spindle in the socket in which it is received.

The retaining means may comprise a detent to engage a retaining part of the roller. The retaining part may comprise a part of the bearing means.

The bearing means may have an inner bearing member and the retaining part may comprise the inner bearing member.

The inner bearing member may comprise an inner race of a rolling element bearing.

The detent may comprise an element extending axially of the stub spindle and having a generally transversely extending abutment surface to engage the retaining part in an at-rest position of the abutment surface relative to the stub spindle and the abutment surface may be transversely displaceable from said at-rest position to permit snap engagement with the retaining part.

The abutment surface may be provided on a nose part of the axially extending element and the nose part may have a cam surface whereby the nose part may be displaced transversely inwardly during axial assembly with the socket.

Each end portion may be barrel shaped meaning a shape which is symmetrical about its axis and bulges in a medial region, for example, that the end portion of the spindle is symmetrical about its axis and has an enveloping surface of generally part prolate spheroid shape and preferably bounded by edges which lie in planes normal to the axis of rotation.

Each end portion may be polygonal in cross-sections taken normal to an elongate axis thereof and may comprise intersecting surfaces which are convexly curved in radial planes containing the axis.

Preferably the surfaces are rectilinear in radial planes normal to said axis.

Preferably each end portion is hexagonal in cross-section.

The end portion may be bounded by edges which lie in planes normal to the axis.

Each socket may be of a prism shape and have a cross-section which corresponds to the maximum cross-section of the end part.

A support portion at least at said one end may be received in an open-topped socket formed in an associated one of the side members.

The open-topped socket may have part of the same or co-operating cross-sectional shape as part of the socket of the roller and the respective shapes of the support portion and the open-topped socket being such that the support portion is constrained against rotation relative to the side member and the end portion is constrained with the support portion.

Each support portion at least at said one end may comprise a shank portion connected to the end portion, the shank being of a configuration which co-operates with the open-topped socket to effect the constraint of rotation and having two spaced apart flanges and the shank being received in the open-topped socket with the flanges either side of the side member.

Each stub spindle may be provided with stop means to limit movement of said end portion inwardly of the socket in which it is received.

Each support portion may provide the stop means.

The stop means may comprise a part of the stub spindle which is adapted to engage a part of the bearing means of the roller to stop movement of the stub spindle inwardly of the socket.

The stub spindle and socket may be adapted to inter-engage to prevent relative rotation therebetween.

The stub spindle may comprise a one-piece moulding of synthetic plastics material.

The synthetic plastics material may be provided with a capability for electrical conductivity. The capability for electrical conductivity may comprise a conductor extending through the support part and having opposite ends for engagement by the bearing means and the conveyor frame.

By virtue of providing each stub spindle with a retaining means, a pair of stub spindles may be assembled with a bearing at an initial stage of assembly of the conveyor. A pair of bearings each with a stub spindle retained therein may then be assembled with each end of a roller and the roller swaged over to retain the bearings therein in known manner. Of course, if desired the bearings may be retained in the rollers in any other desired manner. Finally, such a roller assembly can be offered up to a pair of mounting means of the conveyor frame side members by, for example, grasping the support portions of the stub spindles between thumb and first finger, which will naturally cause the support portions to become mutually aligned and then the support portions can be introduced into the mounting means of the frame members.

As a result assembly of the conveyor is facilitated and avoids the need hitherto encountered firstly to select two stub spindles and then assemble them into the ends of bearings already fitted to a roller whilst on site and then assemble the roller to the conveyor frame whilst ensuring that a stub spindle does not fall out.

By virtue of providing the stub shaft with a support portion which co-operates with an open-topped socket having a part which is of, or can co-operate with, the same cross-sectional shape as part of the socket of the roller, the open-topped socket of the side member can receive a connected spindle of single elongate element type and thus the same rollers and side member may be used with stub spindles or elongate spindles as desired.

Furthermore, the barrel shape of the stub spindle avoids problems which can arise from inaccuracies in the axial alignment of the two stub spindles supporting a particular roller causing misalignment between each stub spindle axis and the roller axis, resulting in an increased radial force being applied to the roller and hence an increased frictional resistance to rotation of the roller. At the same time the provision of a barrel shaped stub spindle ensures that the socket of the roller is engaged by a stub spindle over as wide an area as possible. The provision of the barrel shape allows a limited amount of misalignment during each stub spindle axis and the axis of rotation of the roller and thus an increased radial force is not applied and hence there is no increased frictional resistance to the rotation of the roller and in addition the roller is adequately supported and complete self-alignment is ensured.

According to a further aspect of the invention we provide a method of making a conveyor of the kind specified comprising the steps of selecting a pair of stub spindles, assembling an end portion of each stub spindle in a socket of a bearing means, thereafter assembling each bearing means with opposite ends of a conveyor roller and thereafter assembling a support portion of each stub spindle with mounting means of a pair of spaced side members of the conveyor frame.

Said inter-engagement of the support portion with the mounting means may be achieved by movement of the support portion relative to the mounting means transversely of said roller axis.

BRIEF DESCRIPTION OF THE DRAWINGS

An embodiment of the invention will now be described by way of example with reference to the accompanying diagrammatic drawings, wherein.

DESCRIPTION OF PREFERRED EMBODIMENT

Figure 1:
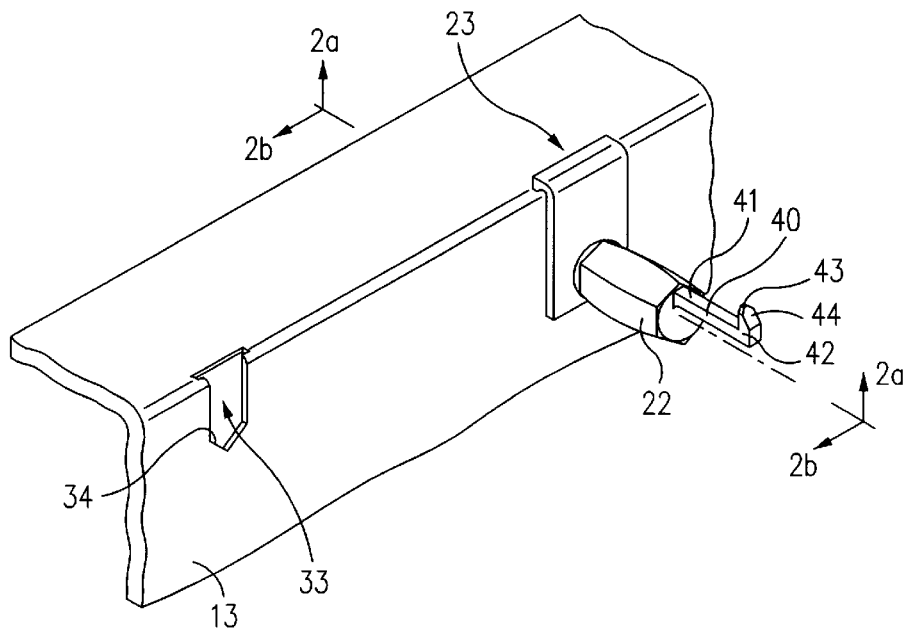
FIG. 1 is a fragmentary perspective view of part of a conveyor embodying the invention.
Figure 2A:
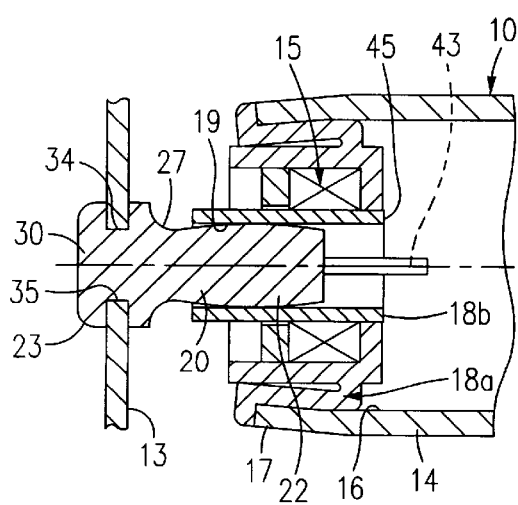
FIG. 2a is a section on the line 2a—2a of FIG. 1.
Figure 2B:
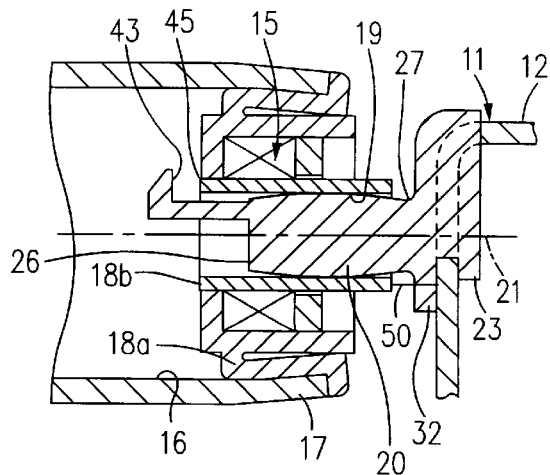
FIG. 2b is a section on the line 2b—2b of FIG. 1.
Figure 3:
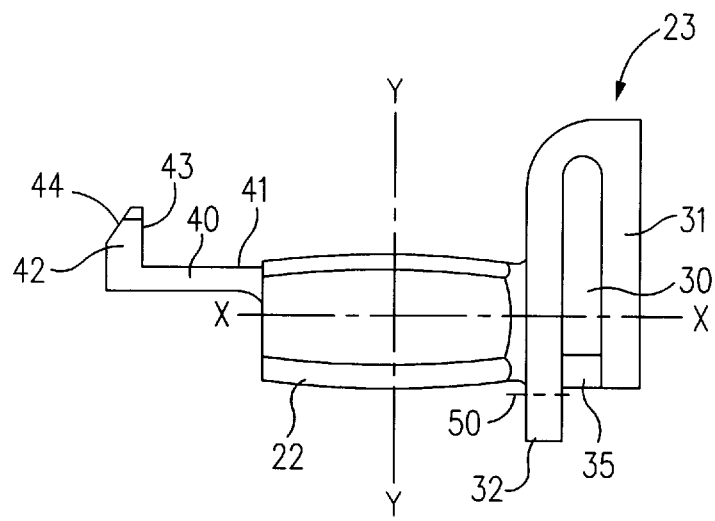
FIG. 3 is a side elevation of a stub spindle of the conveyor of FIGS. 1 and 2.
Figure 4:
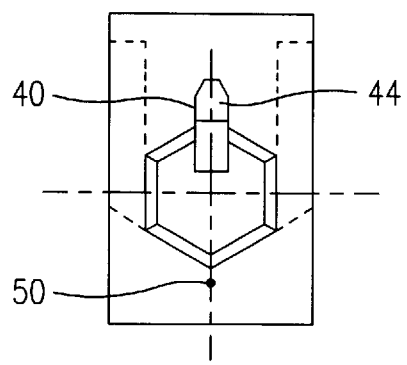
FIG. 4 is an end elevation of the stub spindle of FIG. 3.
Figure 5:
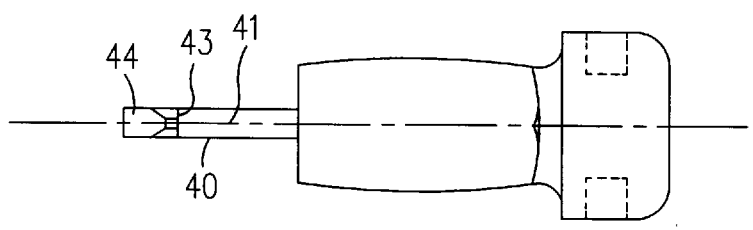
FIG. 5 is a plan view of the stub spindle of FIG. 3.

Referring to FIGS. 1 to 5, a conveyor 10 comprises a pair of side members 11 each being of substantially inverted L-shape in cross-section, comprising a top flange 12 and a downwardly depending side flange 13 and maintained in spaced parallel relationship by cross braces (not shown). The side members 11 are normally carried by upstanding supports (not shown) from a foundation. Extending between the side members 11 are a plurality of rollers 14. Each roller 14 in the present example has a ball bearing 15 mounted in a counter-bore 16 are each end of the roller 14 and maintained in the counter-bore 16 by swaging an end part 17 of the roller inwardly around an outer race 18a of the bearing 15. The outer race 18a has a radially inner part and a radially outer part, which parts provide between them an annular groove which is closed when the radially outer part is deformed inwardly upon swaging of the end part 17 of the roller to increase the security of retention. If desired the groove may not be completely closed but may be sufficiently closed to achieve the desired security of retention in a manner analogous to that described in, for example, GB-1578349.

Each ball bearing 15 has an inner race 18b provided with a socket 19 which, in the present example, is of hexagonal cross-sectional configuration.

Received within each socket 19 is a stub spindle 20 to mount the rollers for rotation about a roller axis 21.

Each stub spindle 20 is a one-piece moulding of synthetic plastics material such as Nylon 6, preferably of grade MDT10 or similar, and comprising an end portion 22 and a support portion 23. The end portion 22 is barrel shaped and hexagonal in cross-section. Accordingly the end portion 22 comprises six identical intersecting surfaces 24, each of which is convexly curved in a radial plane containing the axis 21 and rectilinear in radial planes normal to the axis 21.

The surfaces 24 intersect along curved lines 25 which in the present example are sectors of a circle but which may be of any other desired convex shape and for example may be part of an ellipse and the surfaces 25 are in contact with a conceptual enveloping surface of generally part prolate spheroidal shape.

The outer end of the end portion 22 comprises a radial surface 26 whilst at the inner end of the end portion 22 there is provided a neck 27 which connects the end portion to the support portion 23.

A cross-section taken on the line Y-Y through the position of maximum dimension of the end portion 22 is of a configuration so as to be a good fit in the socket 19 of the roller 14. Thus, the barrel shaped end portion 22 has a central supporting zone which contacts the internal surface of the socket 19 whilst the remaining or relieved zones of the end portion 22 are radially closer to the axis 21 and thus normally do not contact the internal surface of the socket 19, that is, when the longitudinal axes of the end portions coincide with the longitudinal axis 21 of the roller.

Accordingly, a limited amount of misalignment between the longitudinal axis of each stub spindle 20 and the longitudinal axis 21 of the roller can take place, so that a roller mounted on two stub spindles is self-aligning within limits permitted by the shape of the end portions and a degree of misalignment of the stub spindle axes can be tolerated without an unacceptable increase in the frictional resistance to rotation of the roller or other deleterious effect.

Although in the present example the barrel shaped end portion is hexagonal in cross-section, if desired it may be of any other shape in cross-section which co-operates with a socket of corresponding configuration so as to prevent relative rotation therebetween. For example, the end portion may be octagonal or square in cross-section or may be of any other desired number of sides.

Further alternatively, each intersecting surface may be curved in a radial plane normal to the axis of the stub spindle and the curvature may be convex or concave, but in all cases the portion is barrel shaped, that is to say, there is a medial zone of greatest cross-sectional dimensions bounded by lateral zones of progressively decreasing cross-sectional dimension. Generally the portions of the surface of maximum cross-sectional dimension of any particular cross-section lying on a conceptual enveloping surface which is of generally prolate spheroidal shape.

The support portion 23 comprises a shank 30 which lies between two flanges 31, 32 and the shank 30 is received in mounting means comprising open-topped sockets 33, one such socket 33 being shown with the stub spindle removed in FIG. 1.

The sockets 33 are formed in the vertical flange 13 and extend into the top flange 12. Each socket 33 has a part 34 of a configuration which corresponds to the configuration of part of the socket 19 of the rollers 14 and the shank 30 also has a part 35 of corresponding configuration.

In the present example, as illustrated in the Figures, the part 34 comprises a configuration of four sides of a hexagon, as does the part 35 of the shank 30. If desired, the sockets 33 may have a configuration which co-operates with the configuration of the shank 30 and, preferably, the part of the socket 19.

Co-operation between the part 35 of the shank 30 and the part 34 of the socket 33 positively restrains rotation of the stub spindle relative to the side member 11 about the axis of the end portion. The shank 30 has a length substantially equal to the thickness of the flange 13 so that the flanges 31, 32 as at opposite ends of the shank 30 are held in engagement with opposite faces of the flange 13. The shape of the mounting means 33 and of the support portion 23 may vary from the example described hereinbefore so long as they are configured for inter-engagement by relative movement therebetween transverse to said roller axis 21.

A transversely inwardly facing surface 32a of the flange 32 provides a stop means adapted to engage the inner race 18b to stop movement of the stub spindle 20 inwardly of the socket 19.

At the end of the end portion 22 remote from the support portion 23 an elongate element 40 is moulded integrally with the remainder of the stub spindle. The elongate element 40 is of generally square cross-section over the majority of its length and extends so that its upper surface 41 is parallel to a central axis X-X of the stub spindle and is spaced sufficiently radially inwardly from the radially outmost part of the barrel shaped surface at the plane Y-Y to enable relative angular movement between the stub spindle 20 and the socket 19.

At its outer end the elongate element 40 is provided with a nose portion 42 having a detent or abutment surface 43 which extends perpendicular to the axis X-X and a cam surface 44 which, in an at-rest position of the abutment surface 43, is adapted to engage with the bore of the inner race of the bearing to displace the nose portion 42 transversely from said at-rest position, that is radially inwardly, towards the axis X-X during axial assembly of the stub spindle into the bearing and to enable the detent surface 43 to snap into inter-engagement with a retaining part provided by the inwardly facing surface 45 of the inner race 18b to provide a retaining means against movement of the stub spindle outwardly of the socket.

The distance between the stub surface 32a and the abutment surface 43 is such, in relation to the length of the socket, as to permit limited axial movement of the stub spindle relative to the socket to accommodate any variation in spacing of the side members 11 in use.

In use, a pair of stub spindles 20 are axially introduced into the socket 19 of the inner race 18b of a pair of ballbearings 15 at an initial stage of assembly of a conveyor. This stage may, for example, be carried out in a factory remote from the final site of the conveyor.

The rollers with thus assembled stub spindles retained therein are then introduced into opposite ends of the roller 14 and retained therein by swaging the end part 17 of the roller inwardly around the outer race 18a of each bearing 15.

The rollers with thus retained bearings and stub spindles are then transported to an assembly site where an operative may mount the rollers on the side members 11, for example, simply by grasping the support portions 23 of the stub spindles between thumb and first finger, which will naturally cause the support portions to become mutually aligned so that they can be introduced into the sockets 33.

Each stub spindle 22 is assembled with the associated side member 11 by relative movement therebetween transversely to said roller axis by moving the shank 30 downwardly through the open top of the socket 33, so that the flange 31 at the end of the shank 30 remote from the end portion 22 passes through the part of the socket 33 formed in the flange 12.

The sockets 33 in the side members 11 are equally well adapted to receive end parts of corresponding hexagonal configuration of a spindle of the single, elongate element type.

By providing the stub spindle in a synthetic plastics material, for example in Nylon 6 of grade MDT10, surprisingly, a stub spindle having the desired properties of resistance to shock loads, and tolerance to abusive use, can be provided.

Preferably, at least some of the stub spindles are provided with an electrical conductivity capability, for example by incorporating carbon black or other electrically conductive material in the plastics material to make it electrically conductive or by providing other electrically conductive means. As a result, any static electricity which is generated in use of the conveyor is conducted to the conveyor frame and thus to earth. In the illustrated example electrical conductivity is provided by a copper coated steel wire 50 which extends through the inner flange 32 of the support part and has opposite end parts to engage the bearing inner race 18b and the conveyor frame 11. The wire can penetrate any paint provided on the frame to provide metal to metal contact. The length of the wire 50 may be adjusted to accommodate any particular gap between the inner race member 18b and the frame 11.

Whereas metal would be an obvious choice of material, it has been found that to machine stub spindles to the desired design configuration, to a consistently high quality has proved impossible.

Also, to cast or mould metal to the requisite design configuration is far too expensive making a product which is uncompetitive in commercial terms.

The accompanying drawings are diagrammatic and certain features such as the curvature of the barrel shaped stub spindle are exaggerated. In one example the end portion 22 has an across flats width of 8 mm and the radius of curvature of the barrel shaped part is 136 mm. The distance between the retaining surface 43 and the position at which interference occurs between the inner race 18b and the inwardly facing surface 32a of the support portion 23 is 24 mm whilst the end portion 22 is 17 mm long and the inner race 18 is 19 mm long.

A conveyor embodying in the invention avoids the need, on site, for stub spindles to be engaged in the sockets at opposite ends of each conveyor roller and the resultant combination of roller and two stub spindles to be held together manually and then the stub spindles to be manipulated into the side members thereby saving time, expense and inconvenience. In addition, if it is desired to replace a roller and/or bearing, with the conveyor in this invention it is simply necessary to disengage a roller from the conveyor frame by the above-described transverse relative movement between the support portion and the mounting means. Moreover, both during assembly and disassembly the need for axial access to be gained to the side of the conveyor frame for axial movement of a stub spindle or securing means is avoided so that the conveyor frame can be positioned closely adjacent to, for example, a wall of a building or plant or another conveyor frame, since access for introduction or removal of rollers is achieved solely from above.

Although in the above-described example both stub spindles are inter-engaged with mounting means of identical configuration and in the identical way on opposite sides of the conveyor, if desired the stub spindle at one side of the roller may be engaged with the side rail by transverse relative movement in a manner described hereinbefore, for example as a result of the above-mentioned vertically downward movement, as a final operation, whilst the other side of the conveyor roller may be engaged with the associated side rail in a different manner to that described hereinbefore which may involve axial relative movement between the side rail and stub spindle, in which case axial location of the stub spindle relative to the associated side rail may be provided from the other end of the roller. Although, for convenience of manufacture and operation, the above-described symmetrical arrangement is preferred.

The features disclosed in the foregoing description, or the accompanying drawings, expressed in their specific forms or in the terms or means for performing the desired function, or a method or process for attaining the disclosed result, may, separately or in any combination of such features, be utilised for realising the invention in diverse forms thereof.

I claim:

1. A conveyor, comprising a conveyor frame having a pair of spaced side members each having a plurality of mounting means to mount a plurality of rollers in spaced relation between the side members, each roller being provided with a bearing means having a socket, the rollers being mounted in spaced relation between said pair of side members on stub spindles, each stub spindle having a support portion which inter-engages with a mounting means non-rotatably to mount the stub spindles on the side members, there being a pair of opposed stub spindles for each roller and each stub spindle having an end portion which is received in a socket provided at each end of the roller to permit each roller to rotate about a roller axis and wherein at least at one end of each roller the support portion and the mounting means are configured for inter-engagement by relative movement therebetween transverse to said roller axis characterised in that each stub spindle is provided with retaining means to retain the end portion of the stub spindle in the socket in which it is received.

2. A conveyor according to claim 1 wherein the retaining means comprises a detent to engage a retaining part of the roller.

3. A conveyor according to claim 2 wherein said retaining part comprises a part of the bearing means.

4. A conveyor according to claim 3 wherein the bearing means has an inner bearing member and said retaining part comprises said inner bearing member.

5. A conveyor according to claim 4 wherein the inner bearing member comprises an inner race of a rolling element bearing.

6. A conveyor according to claim 2 wherein the detent comprises an element extending axially of said stub spindle and having a generally transversely extending abutment surface to engage said retaining part in an at-rest position of said abutment surface relative to the stub spindle and wherein the abutment surface is transversely displaceable from said at-rest position to permit snap engagement with the retaining part.

7. A conveyor according to claim 6 wherein the abutment surface is provided on a nose part of the axially extending element and the nose part has a cam surface whereby the nose part is displaceable transversely inwardly during axial assembly with the socket.

8. A conveyor according to claim 1 wherein each end portion is barrel shaped.

9. A conveyor according to claim 1 wherein each end portion is polygonal in cross-sections taken normal to an elongate axis thereof and may comprise intersecting surfaces which are convexly curved in radial planes containing said axis.

10. A conveyor according to claim 9 wherein said surfaces are rectilinear in radial planes normal to said axis.

11. A conveyor according to claim 10 wherein each end portion is hexagonal in cross-section.

12. A conveyor according to claim 9 wherein the end portion is bounded by edges which lie in planes normal to the axis.

13. A conveyor according to claim 1 wherein a support portion at least at said one end is received in an open-topped socket formed in an associated one of the side members.

14. A conveyor according to claim 13 wherein said open-topped socket has a part of the same or co-operating cross-sectional shape as part of said socket of the roller and the respective shapes of the support portion and the open-topped sockets are such that the support portion is constrained against rotation relative to the side member and the end portion is constrained with the support portion.

15. A conveyor according to claim 14 wherein each support portion at least at said one end comprises a shank portion connected to the end portion, the shank being of a configuration which co-operates with the open-topped socket to effect said constraint of rotation and having two spaced apart flanges and the shank being received in the open-topped socket with the flanges either side of the side member.

16. A conveyor according to claim 1 wherein each stub spindle is provided with stop means to limit movement of said end portion inwardly of the socket in which it is received.

17. A conveyor according to claim 16 wherein each support portion provides said stop means.

18. A conveyor according to claim 16 wherein the stop means comprises a part of the stub spindle which is adapted to engage a part of the bearing means of the roller to stop movement of the stub spindle inwardly of the socket.

19. A conveyor according to claim 1 wherein the stub spindle and socket are adapted to inter-engage to prevent relative rotation therebetween.

20. A conveyor according to claim 1 wherein the stub spindle comprises a one-piece moulding of synthetic plastics materials.

21. A conveyor according to claim 20 wherein the synthetic plastics material is provided with a capability for electrical conductivity.

22. A conveyor according to claim 21 wherein said capability for electrical conductivity comprises a conductor extending through the support part and having opposite ends for engagement by the bearing means and the conveyor frame.

* * * * *